United States Patent [19]

Last

[11] 4,428,251
[45] Jan. 31, 1984

[54] AUTOMATIC ADJUSTMENT MECHANISM FOR A CABLE DRIVE

[75] Inventor: Daniel F. Last, Romeo, Mich.

[73] Assignee: General Motors Corporation, Detroit, Mich.

[21] Appl. No.: 368,428

[22] Filed: Apr. 14, 1982

[51] Int. Cl.³ .............................................. F16C 1/10
[52] U.S. Cl. ........................... 74/501.5 R; 74/501 R
[58] Field of Search .............. 74/501.5, 501 R, 501 P; 192/111 R, 111 A, 111 T, 111 B; 248/195.1, 191, 197.2; 403/61

[56] References Cited

U.S. PATENT DOCUMENTS

| | | | |
|---|---|---|---|
| 1,361,265 | 12/1920 | Kendrick | 74/501 R |
| 1,688,214 | 10/1928 | Walden | 74/501 X |
| 1,876,731 | 9/1932 | Weate | 74/501 R |
| 2,741,020 | 4/1956 | Arthur | 74/501 R |
| 3,513,718 | 2/1968 | Tomecek | 74/501 R |
| 3,572,159 | 3/1971 | Tschanz | 74/501 R |
| 3,752,008 | 8/1973 | Danek | 74/501 R |
| 3,945,267 | 3/1976 | Stimpson | 74/501 R |
| 3,988,943 | 11/1976 | Orcutt | 74/501 P |
| 4,177,691 | 12/1979 | Fillmore | 74/501 P |
| 4,366,725 | 1/1983 | Kondo | 74/501 R |

Primary Examiner—Leslie A. Braun
Assistant Examiner—Anthony W. Raskob, Jr.
Attorney, Agent, or Firm—Mark A. Navarre

[57] ABSTRACT

In a system wherein a Bowden cable is coupled between driving and driven members, an automatic adjustment system for calibrating the tie-down point of one end of the cable sheath upon initial movement of the driving member to the limit position of its travel so that in subsequent operation the end of travel position of the driven member is coordinated with the end of travel position of the driving member. The end of the sheath nearest the driving member is initially movable over a restricted range of positions and a calibration member is operative when the driving member is moved to the limit position of its travel to lock such end of the sheath in a final calibration position.

2 Claims, 9 Drawing Figures

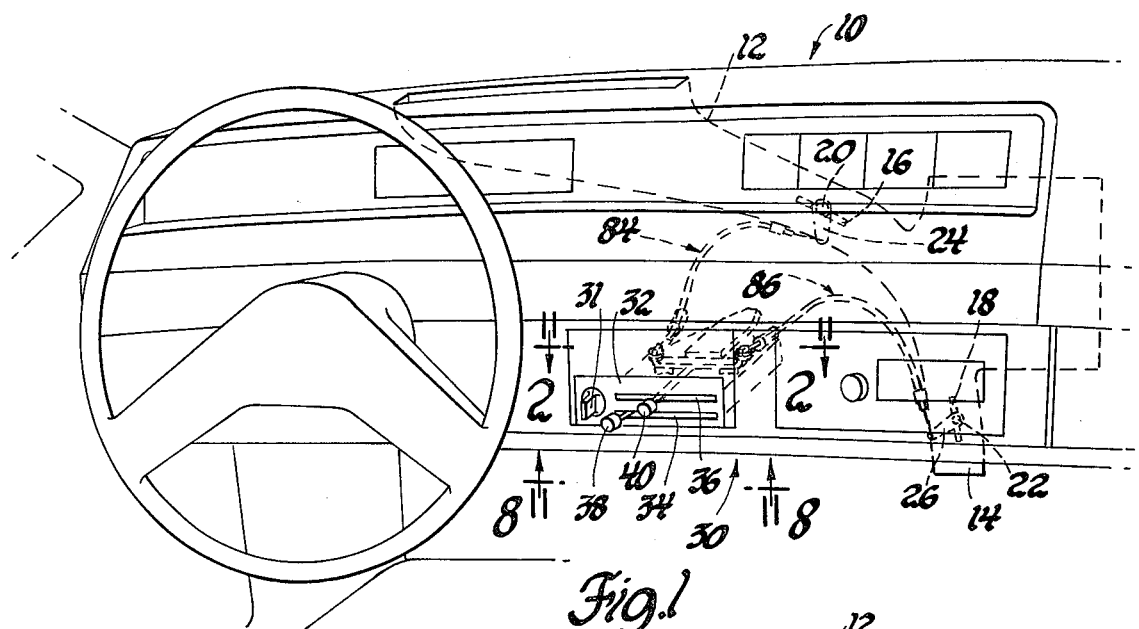
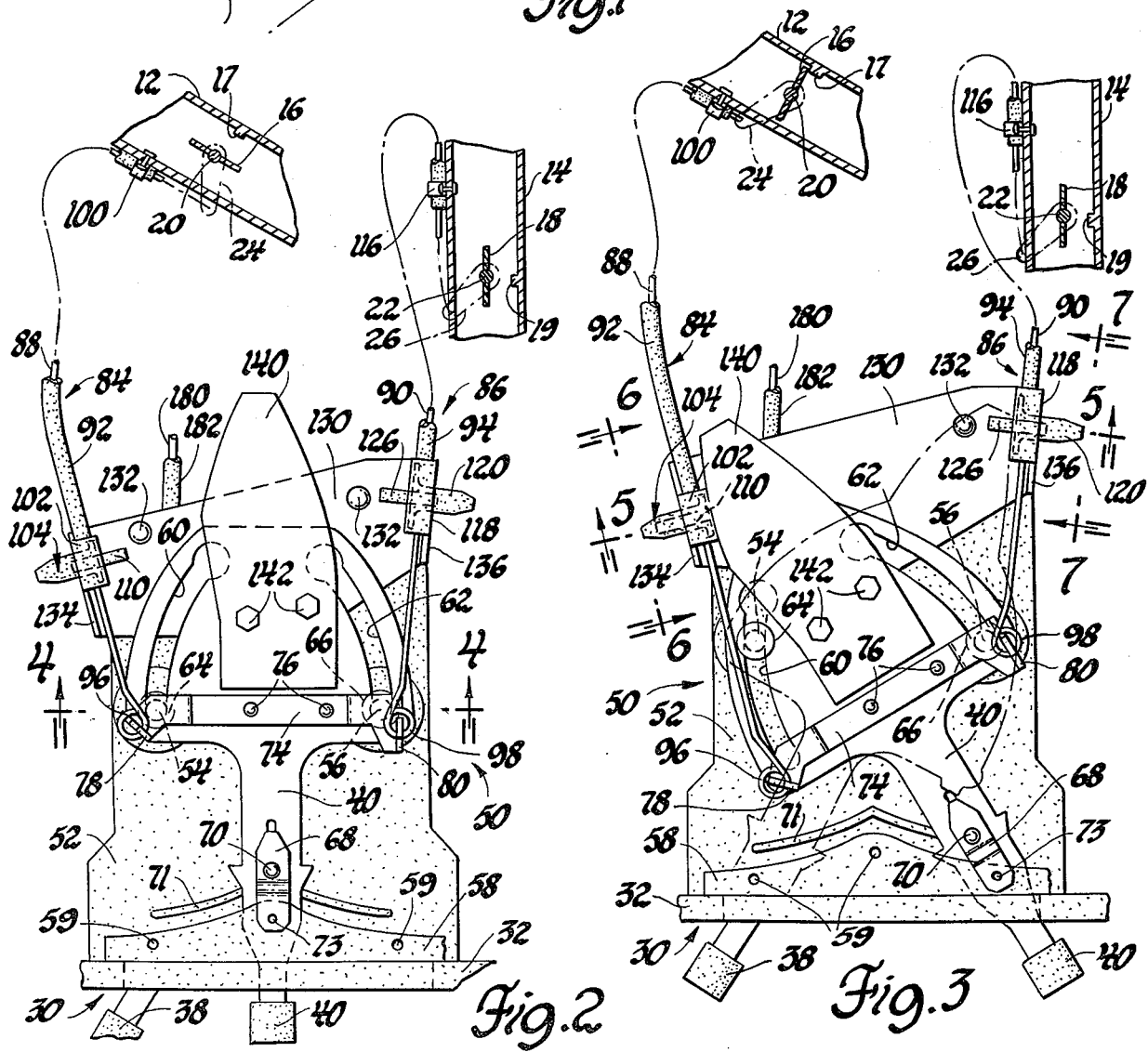

AUTOMATIC ADJUSTMENT MECHANISM FOR A CABLE DRIVE

This invention relates to a flexible cable drive system and more particularly to an automatic adjustment mechanism for such a system.

Cable drive systems are commonly employed in motor vehicle applications for adjusting the position of a remote device such as a ventilation duct door, with a control lever conveniently located in the passenger compartment of the vehicle. The cable (often referred to as a Bowden cable) comprises a wire connected between the control lever and the remote device and a sheath disposed about the wire for guiding the same. The ends of the sheath are secured to stationary support members and the wire is movable within the sheath to define a driving connection between the control arm and the remote device.

Typically, both the control lever and the remote device are movable through limited ranges of travel and it is highly desirable for the remote device to reach the limit of its travel when the control lever reaches the limit of its travel. For example, if the control lever is connected to a ventilation duct door so that the door closes to block the duct in response to movement of the control lever, it is desirable that the door reach the fully closed position when the control lever reaches the limit of its travel. This may be achieved in a custom application by precisely controlling the length and travel path of the cable, but such techniques are not feasible in mass production. To remedy the problem outlined above, a variety of cable adjusting mechanisms have been proposed. Some of such mechanisms require manual intervention in the adjustment while others perform the adjustment automatically. A general problem with prior art adjustment mechanisms is that the adjustment is either inconvenient (as in mechanisms requiring manual intervention) or the adjustment has a tendency to slip during normal operation of the system.

It is accordingly an object of this invention to provide an improved adjustment mechanism for a cable driven system between driving and driven members wherein the adjustment is automatically and permanently made upon initial movement of the driving member to the limit of its travel so that in subsequent operation of the system, the limit position of the driven member is coordinated with that of the driving member.

It is a further object of this invention to provide an improved adjustment mechanism for a cable drive system between driving and driven members wherein one end of the cable sheath is initially movable over a limited range of positions and wherein a calibration member is operative when the driving member reaches the limit of its travel to permanently immobilize the cable sheath with respect to the cable wire such that the limit position of the driven member is coordinated with the limit position of the driving member.

It is a still further object of this invention to provide an improved mechanism of the above type wherein the initial movement of the one end of the sheath is resisted by a guide member which defines the range of such movement so that as the driving member is initially moved toward its limit position, the cable wire moves relative to the cable sheath to move the driven member to its limit position after which further movement of the driving member to its limit position overcomes the resistance so that the wire and sheath move together until the driving member reaches its limit position.

The objects are carried forward with a sheath adjustment mechanism mounted in the vicinity of the control lever. The end of the sheath near the control lever is fitted with an expandable plug extending perpendicular to the sheath. The plug extends through a slotted bracket member so that the plug is movable within the slot along the axis of the cable. A pin is partially inserted into one end of the expandable plug and is operative when fully inserted therein to expand the plug within the slotted member preventing further movement of the cable sheath. A calibration member extending from the control lever is operative when the control lever is moved to the limit of its travel to engage the pin, fully inserting it into the plug.

When the control lever is initially moved to the limit of its travel, the wire moves relative to the sheath to move the controlled device (such as a duct door) to its fully actuated position. When the controlled device reaches the fully actuated position, the sheath moves in unison with the wire, the plug being guided by the slotted member. When the control lever reaches the limit of its travel, the calibration member fully inserts the pin into the plug, expanding the same to securely lock the end of the sheath relative to the wire. In subsequent operation of the control lever, the final position of the sheath is maintained and the limit of travel of the controlled device is coordinated with the limit of travel of the control lever.

IN THE DRAWINGS

FIG. 1 is a view of a motor vehicle instrument panel illustrating the placement of the control lever assembly and the ventilation duct doors controlled thereby.

FIGS. 2 and 3 are views of the control assembly taken along lines 2—2. FIG. 2 shows the initial uncalibrated position, while FIG. 3 shows the final calibrated position.

Figure 4:
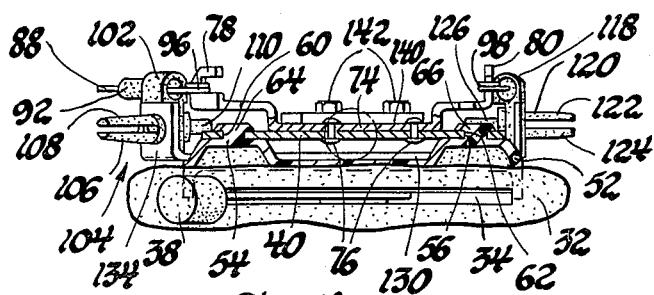
Figure 5:
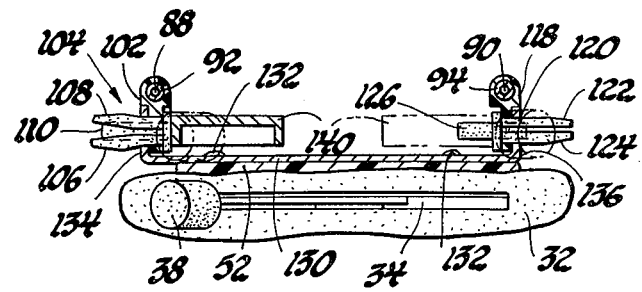
Figure 6:
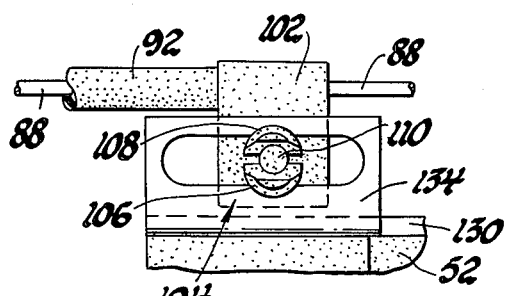
Figure 7:
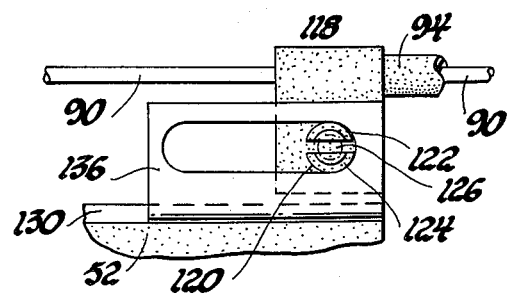
Figure 8:
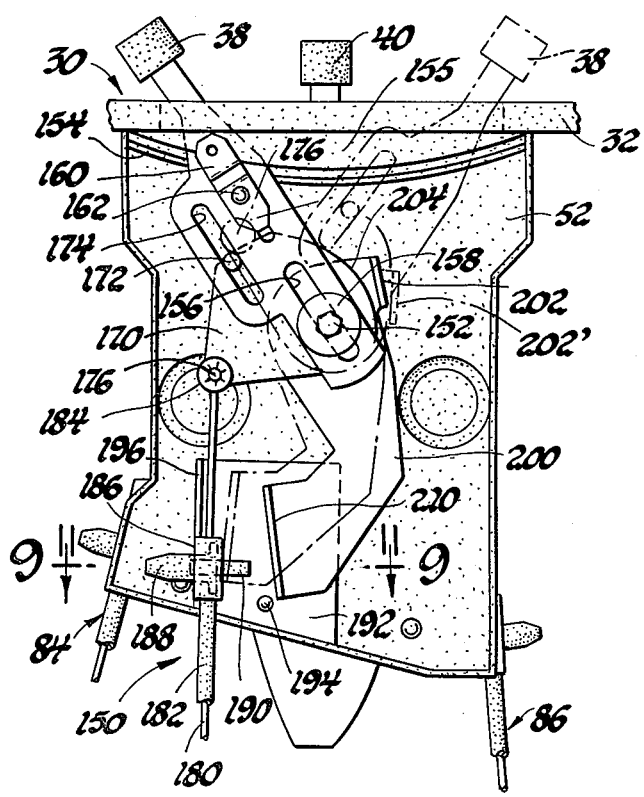
Figure 9:
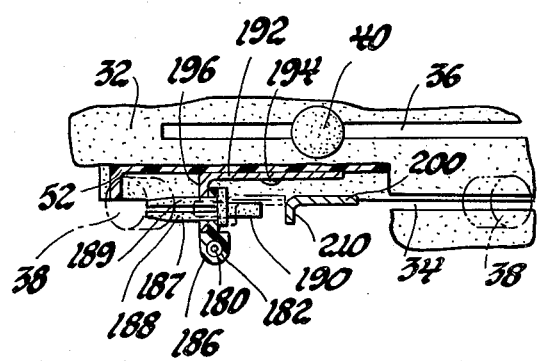

FIG. 4 is a view of FIG. 2 along lines 4—4.
FIG. 5 is a view of FIG. 3 along lines 5—5.
FIG. 6 is a view of FIG. 3 along lines 6—6.
FIG. 7 is a view of FIG. 3 along lines 7—7.
FIG. 8 is a view of FIG. 1 along lines 8—8.
FIG. 9 is a view of FIG. 8 along lines 9—9.

Referring now more particularly to FIG. 1, reference numeral 10 generally designates the instrument panel of a motor vehicle. Ventilation ducts 12 and 14 are located behind the instrument panel 10 in a conventional manner and include damper doors 16 and 18 for controlling the flow of air therethrough. Damper doors 16 and 18 are pivoted about pins 20 and 22, respectively, and each door includes an actuating arm 24 or 26 adapted to pivot the respective door within its duct.

Reference numeral 30 generally designates the cable control head assembly of this invention. The control head facia 32 is mounted on instrument panel 10 and has longitudinal slots 34 and 36 through which control levers 38 and 40 extend. A switch 31 controls the speed of a ventilation blower motor (not shown) in a conventional manner. The remainder of the cable control head assembly 30 extends into the instrument panel and is shown in more detail in FIGS. 2-9.

In FIGS. 2 and 3, reference numeral 50 generally designates the portion of control head assembly 30 related to control lever 40. As indicated in reference to FIG. 1, control lever 40 extends through a slot 36 in the control assembly facia 32. Also shown is a portion of the ventilation ducts 12 and 14, including damper doors 16 and 18. As indicated in reference to FIG. 1, doors 16 and 18 pivot about pins 20 and 22 and actuator arms 24 and 26 are connected to doors 16 and 18 for moving the respective doors within the ducts.

Referring to FIGS. 2-4, control lever 40 and the elements associated therewith will now be described. The control head base 52 is integral with control head facia 32 and supports the control lever 40 at posts 54 and 56 and at contoured guide members 58 and 71, also integral with facia 32 and control head base 52. Posts 54 and 56 extend through arcuate slots 60 and 62 in control lever 40, and post caps 64 and 66 operate to retain control lever 40 on posts 54 and 56. Clip 68 is secured to control lever 40 by rivet connector 70 and includes a dimple 73 which engages complementing dimples 59 in guide members 58 to provide a detent effect at the center and full travel positions of control lever 40.

When control lever 40 is moved to the right as shown in FIG. 3 by solid lines, it pivots about post 56 while post 54 slides within slot 60, and clip 68 follows the right-hand contour of guide member 58. Similarly, when control lever 40 is moved to the left, as indicated in phantom in FIG. 3, it pivots about post 54 while post 56 slides within slot 62, and clip 68 follows the left-hand contour of guide member 58.

Bracket member 74 is attached to control lever 40 via rivet connectors 76. The ends of bracket 74 are upturned to form hooks 78 and 80 for receiving Bowden cable wires 88 and 90 as described below.

A pair of Bowden cables, designated generally by reference numerals 84 and 86, are drivingly connected between control lever 40 and damper door actuator arms 24 and 26. Each cable 84 and 86 comprises a wire 88 or 90 and a surrounding sheath 92 or 94. One end of wire 88 is bent to form an eyelet 96 which is looped around control lever hook 78. The other end of wire 88 is connected to actuator arm 24 so that wire 88 establishes a link between control lever 40 and damper door 16. The end of the sheath 92 near actuator arm 24 is secured to the housing of ventilation duct 12 with sheath connector 100. A connector 102 is crimped or otherwise secured to the end of sheath 92 near control lever 40. Connector 102 comprises an expandable plug 104 having bifurcated fingers 106 and 108 extending perpendicular to the axis of the sheath. A pin 110 is partially inserted into plug 104 as shown in FIG. 2, such pin being operative when fully inserted into plug 104 as shown in FIG. 3, to outwardly splay plug fingers 106 and 108.

Similarly, cable wire 90 is bent to form an eyelet 98 which is looped over control lever hook 80. The other end of wire 90 is connected to actuator arm 26 so that wire 90 establishes a driving connection between control lever 40 and damper door 18. The end of sheath 94 near actuator arm 26 is secured to the housing of ventilation duct 14 with sheath connector 116. A connector assembly 118 is crimped or otherwise secured to the other end of sheath 94. Connector 118 is identical to connector 102 and includes a plug 120 having bifurcated fingers 122 and 124 extending perpendicular to the axis of sheath 94, and partially inserted pin 126.

Bracket 130 is mounted on control head base 52 with rivet connectors 132. The lateral extremities of bracket 130 are upturned and slotted along the axis of the respective cable sheath 92 or 94 to form guide members 134 and 136. Plug 104 extends through the slot in guide member 134 and plug 120 extends through the slot in guide member 136.

Calibration arm 140 is connected to control lever 40 for movement therewith by screw connectors 142. The left-hand and right-hand contours of arm 140 are such that when control lever 40 is moved in either direction toward the limit of travel, the edge surface of arm 140 will engage the pin 110 or 126 associated with the damper door being manipulated. As control lever 40 is moved toward its rightmost limit of travel, the left-hand edge of arm 140 engages pin 110, the contour of arm 140 being such that pin 110 is fully inserted into plug 104 when control lever 40 reaches its rightmost limit of travel as shown in solid lines in FIG. 3. As control lever 40 is moved toward its leftmost position, the right-hand edge of arm 140 engages pin 126, the contour of arm 140 being such that pin 126 is fully inserted into plug 120 when control lever 40 reaches its leftmost limit position as shown in phantom in FIG. 3.

FIGS. 5-7 more clearly depict sheath connectors 102 and 118 before and after fully insertion of pins 110 and 126. In FIG. 5, pin 110 is fully inserted into plug 104 to expand fingers 106 and 108 while pin 126 is only partially inserted into plug 120. FIG. 6 is an end view of expanded plug 104 and FIG. 7 is an end view of unexpanded plug 120. The diameter of the unexpanded plug 104 or 120 relative to the respective slot in guide member 134 or 136 is such that the friction fit therebetween offers resistance to movement of the unexpanded plug in the respective slot. The resistance thereby offered is greater than the resistance encountered in moving duct damper doors 16 or 18 but small enough that it may be overcome by the exertion of greater than normal force on control lever 40.

The operation of the automatic adjustment system of this invention will now be described in reference to FIGS. 1-7. The calibration procedure begins with control lever 40 in the central position as shown in FIG. 2. Plugs 104 and 120 are moved forward (away from hooks 78 and 80) in guide members 134 and 136 prior to installation in the vehicle instrument panel 10. As the control lever 40 is moved toward its rightmost position, it pivots about post 56, thereby pulling wire 88 in a manner to close damper door 16 for blocking ventilation duct 12. In so doing, the cable wire 88 slides within sheath 92 until damper door 16 reaches the limit of its travel as defined by stop 17, blocking duct 12. Plug 104 does not move within guide member 134 during such operation due to the frictional resistance therebetween. Further movement of control lever 40 requires increased force to overcome such resistance. The length of cable 84 is such that when the damper door 16 reaches the limit of its travel, control lever 40 is nearly at the limit of its travel. If control lever 40 is not already at the limit of its travel, the application of sufficient force to control lever 40 produces further movement. Since damper door 16 is fully closed, such further movement results in joint movement of wire 88 and sheath 92, effectively shortening the length of cable 84 between control head assembly 30 and ventilation duct 12. As control lever 40 reaches the limit of its travel as shown in solid lines in FIG. 3, calibration arm 140 engages pin 110 and fully inserts the same into plug 104, expanding fingers 106 and 108 to permanently lock sheath connector 102 relative to guide member 134. In this way, the end of travel position of control lever 40 is coordinated with the end of travel position (fully closed position) of damper door 16. This relationship will continue to exist in subsequent operation of the control mechanism.

A similar calibration procedure is followed with respect to cable 86. As control lever 40 is moved toward its leftmost position, cable wire 90 slides relative to sheath 94 to move damper door 18 toward the limit position of its travel (fully closed) as defined by stop 19. After door 18 engages stop 19, the application of sufficient force to control lever 40 results in joint movement of wire 90 and sheath 94, effectively shortening the length of cable 86 between control head assembly 30 and ventilation duct 14. As control lever 40 reaches its leftmost position, as shown in phantom in FIG. 3, pin 126 is fully inserted into plug 120 expanding fingers 122 and 124 to permanently lock sheath connector 118 relative to guide member 136. In this way, the end of travel position of control lever 40 is coordinated with the end of travel position of damper door 18. Since plug 120 is permanently secured relative to guide member 136, this condition will be maintained for all subsequent operation of control lever 40.

Pins 110 and 126 are preferably tapered so that partial insertion of the pin into its respective plug 104 or 120 will produce little or no expansion of the respective plug fingers. However, the extent of the taper should be such that full insertion of the pin into its respective plug provides secure and permanent locking of the plug 104 or 120 with respect to its associated guide member 134 or 136.

After the calibraton procedure outlined above is completed, movement of control lever 40 to its leftmost or rightmost limit position causes the right-hand or left-hand edge of calibration arm 140 to engage pin 126 or 110 making sure that such pin is fully inserted into its respective plug 120 or 104. Although slippage of pins 110 or 126 within plugs 104 or 120 following completion of the calibration procedure is not expected this feature serves to periodically ensure that pins 110 and 126 are fully inserted.

A second embodiment of the automatic adjustment mechanism of this invention is used in conjunction with control lever 38 and is illustrated in FIGS. 8 and 9. It will be seen in reference to such figures, that unlike control lever 40 which manipulates two cables 84 and 86, control lever 38 manipulates a single cable generally designated by reference numeral 150. Although not shown in FIGS. 8 and 9, the cable 150 controlled by control lever 38 may also be connected to control a ventilation duct damper door, such as a door controlling the temperature of the ventilation air.

Control lever 38 extends through the control head facia 32 and is supported by the control head base 52 at post 152 and at guide members 154 and 155. In the illustrated embodiment, post 152 is a screw passing through a slot 156 in control lever 38 and seated in control head base 52. A washer 158 seated between the screw head and control lever 38 serves to retain control lever 38 along the axis of screw 152. A clip 160 is fastened to control lever 38 by rivet connector 162 and engages guide member 154 to restrain control lever 38 in the forward direction. As control lever 38 is moved from its leftmost position, as viewed in solid lines in FIG. 8, to its rightmost position as viewed in phantom in FIG. 8, screw 152 slides in slot 156 to accommodate the contour of guide members 154 and 155.

A cable driving member 170 is located between control lever 38 and control head base 52 and is pivotally restrained by screw 152. Member 170 also includes a first post 172 extending through a slot 174 in control lever 38, and a second post 176 for receiving one end of a Bowden cable wire. The interaction between post 172 and control lever slot 174 during movement of control lever 38 from its leftmost position to its rightmost position operates to move post 176 from the position shown in solid lines in FIG. 8 to the position shown in phantom.

Cable 150 comprises a wire 180 and a surrounding sheath 182. As with cables 84 and 86, one end of wire 180 is connected to a controlled device such as a damper door, and the other end of wire 180 is bent to form an eyelet that is looped over post 176. A resilient connector 184 is pushed onto post 176 to restrain wire 180. As with cable sheaths 92 and 94, the end of sheath 182 nearest the controlled device is clamped or otherwise secured so as to be immobilized relative to wire 180. A sheath connector 186 is crimped or otherwise secured to the other end of sheath 182 and includes an expandable plug 188 having fingers 187 and 189 extending perpendicular to the axis of sheath 182, and a partially inserted pin 190. Connector 186 is identical to connectors 102 and 118 illustrated in FIGS. 2-7. A bracket member 192 is secured to control head base 52 via rivet connector 194, and a lateral extremity of member 192 is upturned and slotted along the axis of cable sheath 182 to form a guide member 196 for receiving plug 188 of connector 186. As in the first embodiment, plug 188 is slidable within the slot in guide member 196 during a calibration procedure explained below.

A calibration arm 200 is located between cable driving member 170 and control head base 52 and is pivotally restrained by screw 152. Arm 200 includes an upturned tab 202 adapted to be engaged by the lateral surface 204 of cable driving member 170 as control lever 38 is moved from its leftmost position to its rightmost position.

Calibration arm 200 includes a second upturned tab 210 adapted to engage pin 190 and fully insert the same into expandable plug 188 as shown in phantom in FIG. 8 as control lever 38 is moved to its rightmost position. In such position, tab 202 of calibration arm 200 is also shown in phantom and designated by reference numeral 202'.

The operation of the automatic adjustment mechanism depicted in FIGS. 8 and 9 will now be described, it being apparent that the calibration position of control lever 38 corresponding to a fully actuated position of the controlled device (not shown) occurs when control lever 38 is moved to its rightmost position as shown in phantom in FIG. 8. Initially, at assembly, connector 186 is moved against the end of the slot in guide member 196 as shown in FIG. 8, allowing for maximum travel during the calibration procedure. Also, at this time, control lever 38 is in its leftmost position as indicated in solid lines. As control lever 38 is moved toward its rightmost position, wire 180 slides within sheath 182 to move the controlled device toward the limit of its travel. When the controlled device reaches the limit of its travel, further movement of control lever 38 (with the application of sufficient force) moves wire 180 and sheath 182 in unison, causing plug 188 to slide in the guide member 196. As control lever 38 approaches the limit of its travel (the rightmost position), surface 204 of cable driving member 170 engages tab 202 of calibration arm 200 thereby causing tab 210 of arm 200 to engage pin 190. The shape of arm 200 is such that when control lever 38 reaches its rightmost position, tab 210 of arm 200 fully inserts pin 190 into expandable plug 188, permanently securing connector 186 (and thus the end of sheath 182) with respect to guide member 192 and control head base 52. At such point, the calibration procedure is completed to coordinate the end of travel position of the controlled device with the rightmost position of control lever 38. In subsequent operation of control lever 38, such calibration is retained.

It will be noted that once the calibration procedure is completed, surface 204 of cable driving member 170 only engages tab 202 of calibration arm 200 when control lever 38 is at or near the right-hand limit position shown in phantom in FIG. 8. Each time control lever 38 is moved to the right-hand limit position, however, tab 210 of calibration arm 200 engages pin 190 thereby making sure that pin 190 is maintained in the fully inserted position for locking the end of sheath 182 in the calibration position.

Although this invention has been described in reference to specific embodiments, it will be appreciated that the scope of this invention is not meant to be limited thereto but rather is defined by the language of the appended claims.

The embodiments of the invention in which an exclusive property or privilege is claimed are defined as follows:

1. In a system including a driving member coupled to a driven member through a flexible cable having a wire connected between the members and a surrounding sheath which is secured so that the wire is movable within the sheath to move the driven member toward a limit position of its travel as the driving member is moved toward a limit position of its travel, apparatus for calibrating the system upon initial movement of the driving member to its limit position so that thereafter the driven member is calibrated to reach its limit position as the driving member reaches its limit position, the apparatus comprising:

holding means including a guide member engaging one end of said sheath for slidably restraining the same along the axis of said cable so that as the driving member is initially moved toward its limit position, said holding means restrains the one end of the sheath permitting movement of the wire relative to the sheath to move the driven member to its limit position, after which further movement of the driving member toward its limit position overcomes such restraint so that said wire and sheath move together relative to said guide member until the driving member reaches its limit position, said holding means further including a locking member actuable to secure the one end of the sheath to said guide member; and a calibration member connected to said driving member for movement therewith and effective when said driving member is initially moved to its limit position to actuate said locking member to secure the sheath near the one end thereby defining a final position of the one end of the sheath so that in subsequent operation of the system, the driven member reaches its limit position as the driving member reaches its limit position.

2. In a system including a manually operated driving member pivotally supported by a control housing and coupled to a remote driven member through a flexible cable having a wire connected between the members and a surrounding sheath which is secured so that the wire is movable within the sheath to move the driven member toward a limit position of its travel as the driving member is moved toward a limit position of its travel, apparatus for calibrating the system upon initial movement of the driving member to its limit position so that thereafter the limit position of the driven member is coordinated with the limit position of the driving member, the apparatus comprising:

means for immobilizing one end of said sheath relative to said driven member;

a bracket member secured to the control housing and having an elongated opening extending substantially parallel to the axis of said sheath;

locking means secured to the other end of said sheath and including an expandable plug through said opening, said plug slidably engaging the periphery of said opening to resist movement of said plug relative to said bracket member so that as the driving member is initially moved toward its limit position, the wire moves relative to the sheath to move the driven member to its limit position, after which further movement of the driving member toward its limit position overcomes the resistance between the plug and the bracket member so that said wire and sheath move together relative to said bracket member until the driving member reaches its limit position, said locking means further including a pin actuable to expand said plug for permanently securing said other end of the sheath to said bracket; and a calibration member connected to said driving member for movement therewith and effective when said driving member is moved to its limit position to actuate said pin to permanently secure said other end of the sheath to said bracket member, thereby defining a final position of said other end of the sheath so that in subsequent operation of the system, the limit position of the driven member is coordinated with the limit position of the driving member.

* * * * *